US011908612B2

(12) United States Patent
Lee et al.

(10) Patent No.: US 11,908,612 B2

(45) **Date of Patent: *Feb. 20, 2024**

(54) COIL COMPONENT

(71) Applicant: SAMSUNG ELECTRO-MECHANICS CO., LTD., Suwon-si (KR)

(72) Inventors: Dong Seob Lee, Suwon-si (KR); Jong Min Lee, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/952,508

(22) Filed: Sep. 26, 2022

(65) Prior Publication Data

US 2023/0023322 A1 Jan. 26, 2023

Related U.S. Application Data

(63) Continuation of application No. 16/673,191, filed on Nov. 4, 2019, now Pat. No. 11,488,770.

(30) Foreign Application Priority Data

Dec. 17, 2018 (KR) ........................ 10-2018-0163243

(51) Int. Cl.
*H01F 27/29* (2006.01)
*H01F 27/32* (2006.01)
(Continued)

(52) U.S. Cl.
CPC ............. *H01F 27/292* (2013.01); *H01F 3/08* (2013.01); *H01F 17/04* (2013.01); *H01F 27/022* (2013.01);
(Continued)

(58) Field of Classification Search
CPC .......... H01F 27/292; H01F 3/08; H01F 17/04; H01F 27/022; H01F 27/306; H01F 27/324; H01F 2017/048
See application file for complete search history.

(56) References Cited

U.S. PATENT DOCUMENTS

2013/0222101 A1* 8/2013 Ito .............................. H01F 3/08 336/83
2014/0167897 A1* 6/2014 Choi ...................... H01F 41/046 336/83
(Continued)

FOREIGN PATENT DOCUMENTS

KR 10-1442402 B1 9/2014
KR 10-2017-0086362 A 7/2017
(Continued)

OTHER PUBLICATIONS

Office Action issued in corresponding Korean Patent Application No. 10-2018-0163243 dated Nov. 29, 2019, with English abstract.

*Primary Examiner* — Marlon T Fletcher
*Assistant Examiner* — Malcolm Barnes
(74) *Attorney, Agent, or Firm* — Morgan, Lewis & Bockius LLP

(57) ABSTRACT

A coil component includes an insulating substrate; a coil portion disposed on at least one surface of the insulating substrate; and a body embedding the insulating substrate and the coil portion and having an active portion in which the coil portion is disposed, and a cover portion disposed on the active portion. A ratio of a thickness (T2) of the cover portion to a thickness (T1) of the insulating substrate satisfies 3<T2/T1<6, and the thickness (T2) of the cover portion satisfies 90 μm<T2<120 μm.

10 Claims, 3 Drawing Sheets

I-I'

(51) Int. Cl.
*H01F 27/02* (2006.01)
*H01F 3/08* (2006.01)
*H01F 17/04* (2006.01)
*H01F 27/30* (2006.01)

(52) U.S. Cl.
CPC ......... *H01F 27/306* (2013.01); *H01F 27/324* (2013.01); *H01F 2017/048* (2013.01)

(56) References Cited

U.S. PATENT DOCUMENTS

| | | | | |
|---|---|---|---|---|
| 2014/0285305 | A1* | 9/2014 | Yoo | H01F 27/255<br>336/200 |
| 2015/0255206 | A1* | 9/2015 | Han | H01F 41/041<br>336/192 |
| 2016/0172102 | A1* | 6/2016 | Jeong | H01F 27/255<br>29/605 |
| 2016/0172103 | A1* | 6/2016 | Jeong | H01F 27/255<br>29/605 |
| 2017/0032885 | A1* | 2/2017 | Lee | H01F 41/046 |
| 2017/0287621 | A1* | 10/2017 | Seino | H01F 1/26 |
| 2017/0345556 | A1* | 11/2017 | Kim | H01F 17/0013 |

FOREIGN PATENT DOCUMENTS

| | | | |
|---|---|---|---|
| KR | 10-2017-0113136 | A | 10/2017 |
| KR | 10-1832547 | B1 | 2/2018 |
| KR | 10-1832608 | B1 | 2/2018 |

* cited by examiner

COIL COMPONENT

CROSS-REFERENCE TO RELATED APPLICATION(S)

This application is the continuation application of U.S. patent application Ser. No. 16/673,191 filed on Nov. 4, 2019, which claims benefit of priority to Korean Patent Application No. 10-2018-0163243 filed on Dec. 17, 2018 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices, along with a resistor and a capacitor.

With higher performance and smaller sizes gradually implemented in electronic devices, coil components are becoming thinner.

Even when the coil component is made thinner, since the coil component secures the proper inductance and the direct-current (DC) resistance (Rdc), there may be a limitation in reducing the coil thickness of the coil component.

Therefore, in thinning the coil components, research is being conducted to reduce at least one of the thickness of the external electrodes other than the coil, the thickness of the upper and lower covers disposed respectively in the upper and lower portions of the coil, and the thickness of the support substrate for supporting the coil.

SUMMARY

An aspect of the present disclosure is to provide a coil component capable of securing high-capacity inductance and low direct-current (DC) resistance (Rdc) while being low profile.

According to an aspect of the present disclosure, a coil component includes an insulating substrate; a coil portion disposed on at least one surface of the insulating substrate; and a body embedding the insulating substrate and the coil portion and having an active portion in which the coil portion is disposed, and a cover portion disposed on the active portion. A ratio of a thickness (T2) of the cover portion to a thickness (T1) of the insulating substrate satisfies $3<T2/T1<6$, and the thickness (T2) of the cover portion satisfies $90\ \mu m<T2<120\ \mu m$.

According to another aspect of the present disclosure, a coil component includes a body; an insulating substrate embedded in the body; and a coil portion disposed on at least an upper surface of the insulating substrate. A ratio of a distance (T2) from an upper surface of the coil portion to an upper surface of the body to a thickness (T1) of the insulating substrate satisfies $3<T2/T1<6$, and a distance (T2) from the upper surface of the coil portion to an upper surface of the body satisfies $90\ \mu m<T2<120\ \mu m$.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
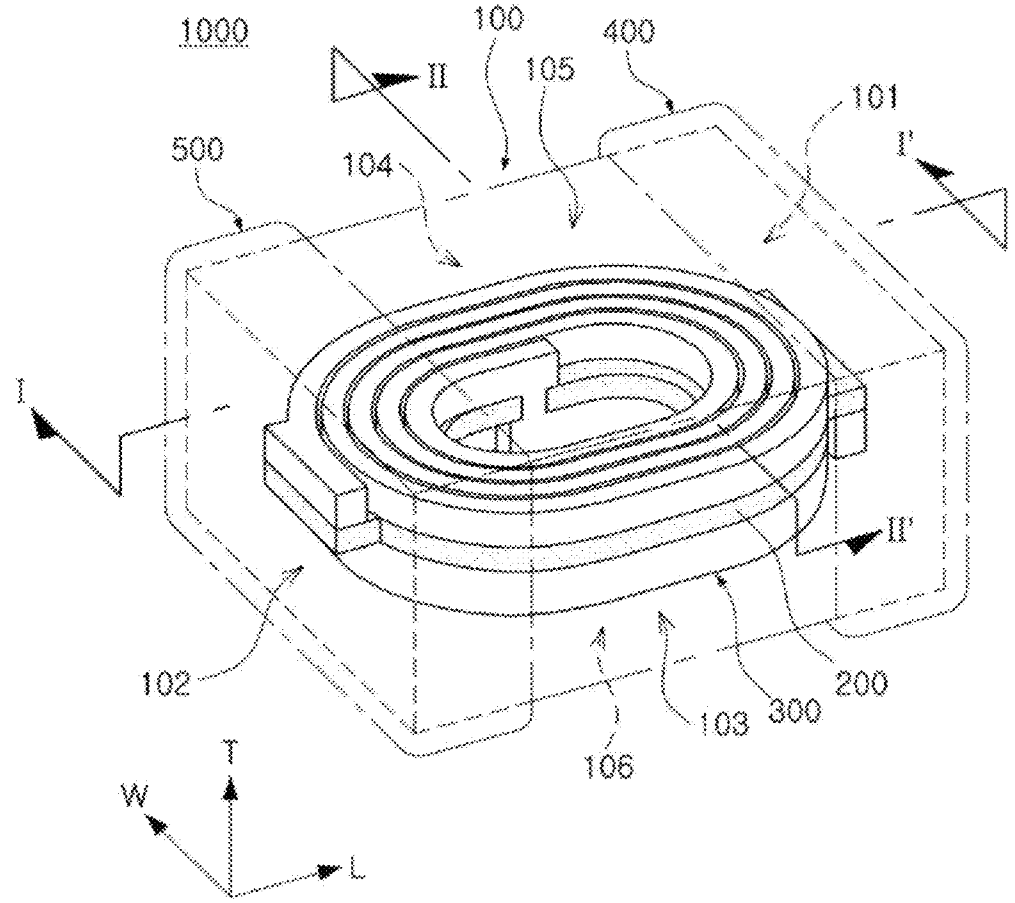
FIG. 1 is a schematic view illustrating a coil component according to an embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, portions, or combination thereof, and do not exclude the possibilities of combination or addition of one or more additional features, numbers, steps, operations, elements, portions, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
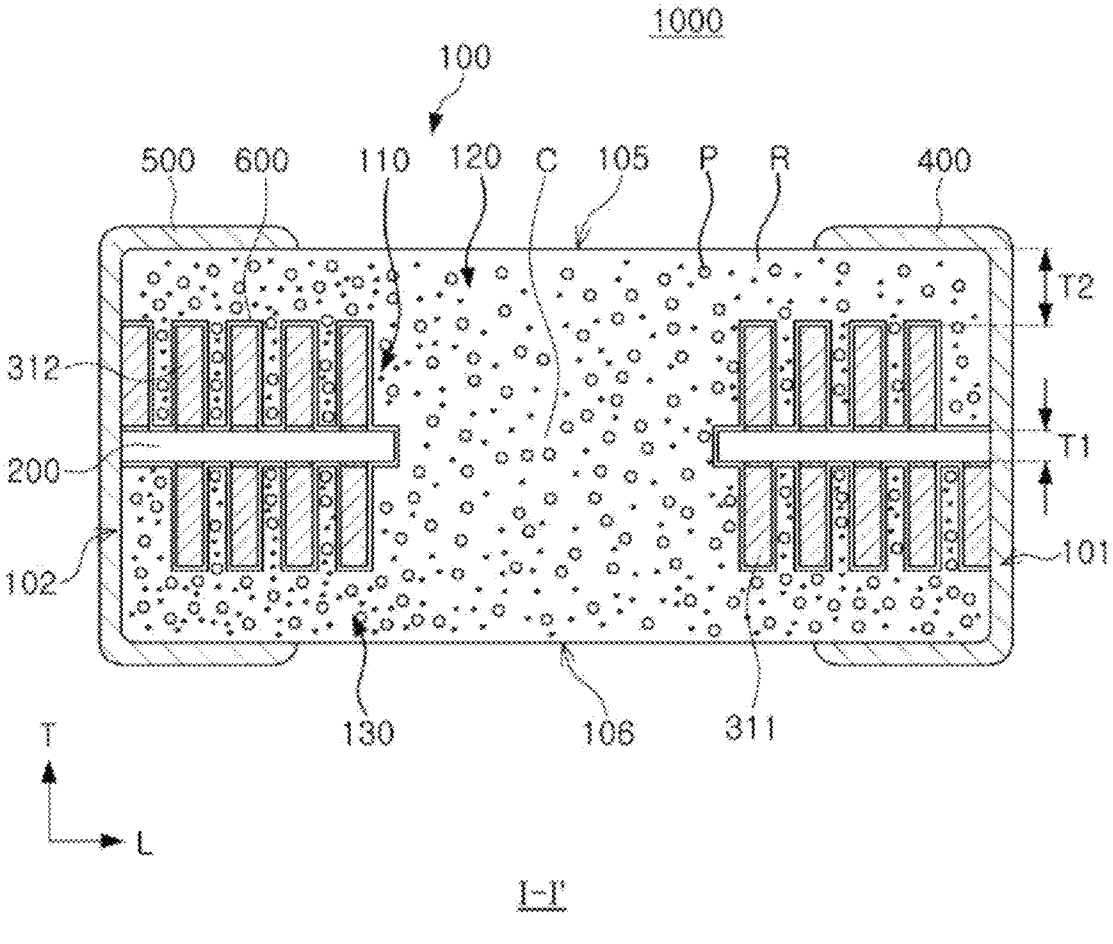
FIG. 2 is a cross-sectional view taken along line I-I' of FIG. 1.
Figure 3:
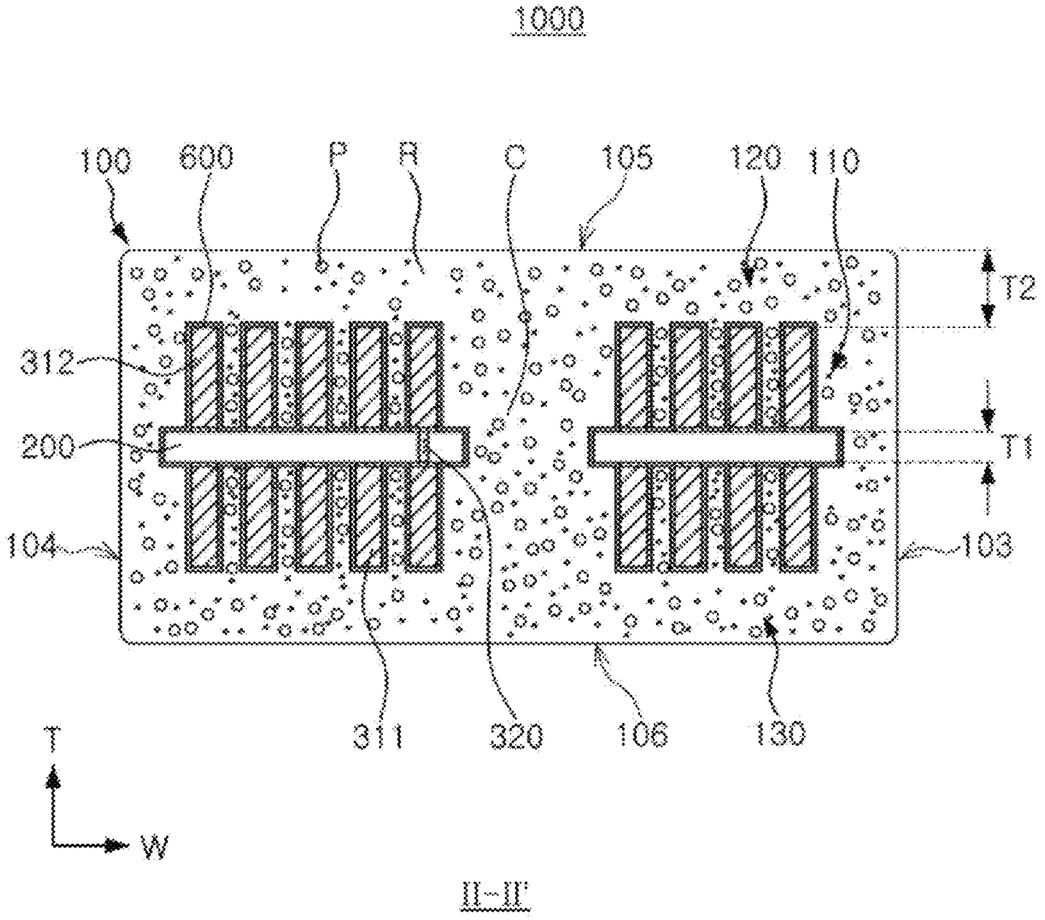
FIG. 3 is a cross-sectional view taken along line II-IF of FIG. 1.

FIG. 1 is a schematic view illustrating a coil component according to an embodiment of the present disclosure. FIG. 2 is a cross-sectional view taken along line I-I' of FIG. 1. FIG. 3 is a cross-sectional view taken along line II-IF of FIG. 1.

Referring to FIGS. 1 to 3, a coil component 1000 according to an embodiment of the present disclosure may include a body 100, an insulating substrate 200, a coil portion 300, and external electrodes 400 and 500, and may further include an insulating film 600.

The body 100 may form an exterior of the coil component 1000 according to this embodiment, and the insulating substrate 200 and the coil portion 300 may be embedded therein.

The body 100 may be formed to have a hexahedral shape overall.

Referring to FIGS. 1 to 3, the body 100 may include a first surface 101 and a second surface 102 facing each other in a length direction L, a third surface 103 and a fourth surface 104 facing each other in a width direction W, and a fifth surface 105 and a sixth surface 106 facing each other in a thickness direction T. Each of the first to fourth surfaces 101, 102, 103, and 104 of the body 100 may correspond to wall surfaces of the body 100 connecting the fifth surface 105 and the sixth surface 106 of the body 100. Hereinafter, both end surfaces of the body 100 may refer to the first surface 101 and the second surface 102 of the body 100, both side surfaces of the body 100 may refer to the third surface 103 and the fourth surface 104 of the body 100, one surface of the body 100 may refer to the sixth surface 106 of the body 100, and the other surface of the body 100 may refer to the fifth surface 105 of the body 100. Further, hereinafter, an upper surface and a lower surface of the body 100 may refer to the fifth surface 105 and the sixth surface 106 of the body 100, respectively, based on the directions of FIGS. 1 to 3.

The body 100 may be formed such that the coil component 1000 according to this embodiment in which the external electrodes 400 and 500 to be described later are formed has a length of 2.0 mm, a width of 1.2 mm, and a thickness of 0.65 mm, but is not limited thereto. Alternatively, the body 100 may be formed such that the coil component 1000 according to this embodiment in which the external electrodes 400 and 500 to be described later are formed has a length of 2.0 mm, a width of 1.6 mm, and a thickness of 0.55 mm. Alternatively, the body 100 may be formed such that the coil component 1000 according to this embodiment in which the external electrodes 400 and 500 to be described later are formed has a length of 2.0 mm, a width of 1.2 mm, and a thickness of 0.55 mm. Alternatively, the body 100 may be formed such that the coil component 1000 according to this embodiment in which the external electrodes 400 and 500 to be described later are formed has a length of 1.2 mm, a width of 1.0 mm, and a thickness of 0.55 mm. Since the above-described sizes of the coil component 1000 according to this embodiment are merely illustrative, cases in which sizes are smaller than the above-mentioned sizes may be not excluded from the scope of the present disclosure.

The body 100 may include a magnetic powder particle (P) and an insulating resin (R). Specifically, the body 100 may be formed by stacking at least one magnetic composite sheet including the insulating resin (R) and the magnetic powder particle (P) dispersed in the insulating resin (R), and then curing the magnetic composite sheet. The body 100 may have a structure other than the structure in which the magnetic powder particle (P) may be dispersed in the insulating resin (R). For example, the body 100 may be made of a magnetic material such as ferrite.

The magnetic powder particle (P) may be, for example, a ferrite powder particle or a metal magnetic powder particle.

Examples of the ferrite powder particle may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the metal magnetic powder particle may be a Fe—Si—B—Cr-based amorphous alloy powder, but is not limited thereto.

The ferrite powder and the metal magnetic powder particle may have an average diameter of about 0.1 μm to 30 μm, respectively, but are not limited thereto.

The body 100 may include two or more types of magnetic powder particles (P) dispersed in an insulating resin (R). In this case, the term "different types of magnetic powder particle (P)" means that the magnetic powder particles (P) dispersed in the insulating resin (R) are distinguished from each other by diameter, composition, crystallinity, and a shape. For example, the body 100 may include two or more magnetic powder particles (P) of different diameters.

The insulating resin (R) may include an epoxy, a polyimide, a liquid crystal polymer, or the like, in a single form or in combined forms, but is not limited thereto.

The body 100 may include a core (C) passing through the coil portion 300 to be described later. The core (C) may be formed by filling at least a portion of the magnetic composite sheet with through-holes formed in the insulating substrate 200 in operations of stacking and curing the magnetic composite sheet, but is not limited thereto.

The body 100 may have an active portion 110 and cover portions 120 and 130 disposed on the active portion 110. The active portion 110 may refer to a region in which the coil portion 300 is disposed in the body 100, and the cover portions 120 and 130 may refer to a region disposed on the active portion 110 of the body 100. As a non-limiting example, based on FIGS. 2 and 3, the active portion 110 may refer to one region of the body 100 corresponding to a distance from a lower surface of a first coil pattern 311 to an upper surface of a second coil pattern 312, and the cover portions 120 and 130 may refer to the other region of the body 100 respectively disposed on the first and second coil patterns 311 and 312. Based on FIGS. 2 and 3, the cover portions 120 and 130 may include an upper cover portion 120 which may be an upper region of the body 100, and a lower cover portion 130 which may be a lower region of the body 100.

A thickness (T2) of the upper cover portion 120 may be formed in a range of more than 90 μm to less than 120 μm. For example, a thickness (T2) of the upper cover portion 120 satisfies 90 μm<T2<120 μm. When the thickness (T2) of the upper cover portion 120 is 90 μm or less, it may be difficult to secure a high-capacity inductor, and when the thickness (T2) of the upper cover portion 120 is 120 μm or more, it may be disadvantageous in thinning a coil component. The above description of the thickness (T2) of the upper cover portion 120 may be applied to the lower cover portion 130 as well.

As a non-limiting example, the active portion 110 may have magnetic permeability greater than magnetic permeability of the cover portions 120 and 130. To this end, the magnetic powder particle (P) disposed in the active portion 110 may have a higher magnetic permeability than the magnetic powder particle (P) in the cover portions 120 and 130. Alternatively, a filling ratio of the magnetic powder particle (P) in the active portion 110 may be higher than a filling ratio of the magnetic powder particle (P) in the cover portions 120 and 130.

The insulating substrate 200 may be embedded in the body 100. The insulating substrate 200 may be configured to support the coil portion 300, which will be described later.

The insulating substrate 200 may be formed of an insulating material including a thermosetting insulating resin such as an epoxy resin, a thermoplastic insulating resin such as polyimide, or a photosensitive insulating resin, or may be formed of an insulating material in which a reinforcing material such as a glass fiber or an inorganic filler is impregnated with such an insulating resin. For example, the insulating substrate 200 may be formed of an insulating material such as prepreg, Ajinomoto Build-up Film (ABF), FR-4, a bismaleimide triazine (BT) film, a photoimageable dielectric (PID) film, and the like, but are not limited thereto.

As the inorganic filler, at least one or more selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the insulating substrate 200 is formed of an insulating material including a reinforcing material, the insulating substrate 200 may provide better rigidity. When the insulating substrate 200 is formed of an insulating material not containing glass fibers, the insulating substrate 200 may be advantageous for reducing a thickness of the overall coil portion 300. When the insulating substrate 200 is formed of an insulating material containing a photosensitive insulating resin, the number of processes for forming the coil portion 300 may be reduced. Therefore, it may be advantageous in reducing production costs, and a fine via may be formed.

A thickness (T1) of the insulating substrate 200 may be formed to be more than 20 μm but less than 30 μm. For example, $20\ \mu m < T1 \leq 30\ \mu m$ may be satisfied. When the thickness (T1) of the insulating substrate 200 is 20 μm or less, it may be difficult to secure the rigidity of the insulating substrate 200, and it may be difficult to support the coil portion 300 to be described later in the manufacturing process. When the thickness (T1) of the insulating substrate 200 is greater than 30 μm, it may be disadvantageous in reducing the width of the coil component.

The ratio of the thickness (T2) of the upper cover portion 120 to the thickness (T1) of the insulating substrate 200 may be more than 3, but less than 6. For example, $3 < T2/T1 < 6$ may be satisfied. When the ratio of T2/T1 is 3 or less, the inductance may decrease. When the ratio of T2/T1 is 6 or more, the DC resistance (Rdc) may increase.

The coil portion 300 may be embedded in the body 100 to manifest the characteristics of the coil portion. For example, when the coil component 1000 of this embodiment is used as a power inductor, the coil portion 300 may function to stabilize the power supply of an electronic device by storing an electric field as a magnetic field and maintaining an output voltage.

The coil portion 300 may include the coil patterns 311 and 312, and a via 320. Specifically, based on the directions of FIGS. 1, 2 and 3, a first coil pattern 311 may be disposed on a lower surface of the insulating substrate 200 facing the sixth surface 106 of the body 100, and a second coil pattern 312 may be disposed on an upper surface of the insulating substrate 200 facing the fifth surface 105 of the body 100. The via 320 may pass through the insulating substrate 200, and may be in contact with and connected to the first coil pattern 311 and the second coil pattern 312, respectively. In this configuration, the coil portion 300 may function as a single coil which forms one or more turns about the core (C) overall.

Each of the first coil pattern 311 and the second coil pattern 312 may be in a planar spiral shape having at least one turn formed about the core (C). For example, the first coil pattern 311 may form at least one turn about the core (C) on the lower surface of the insulating substrate 200.

At least one of the via 320, and the coil patterns 311 and 321 may include at least one conductive layer. For example, when the second coil pattern 312 and the via 320 are formed on a side of the upper surface of the insulating substrate 200 by a plating process, the second coil pattern 312 and the via 320 may include a seed layer and an electroplating layer, respectively. In this case, each of the seed layer and the electroplating layer may have a single-layer structure or a multilayer structure. The electroplating layer of the multilayer structure may be formed using a conformal film structure in which one electroplating layer is covered by another electroplating layer, and another electroplating layer is stacked on only one surface of the one electroplating layer, or the like. The seed layer may be formed by a vapor deposition process such as an electroless plating process, a sputtering process, or the like. In the former case, the seed layer may be formed of an electroless copper plating solution, but is not limited thereto. In the latter case, the seed layer may include at least one of titanium (Ti), chrome (Cr), nickel (Ni), and copper (Cu). The seed layer of the second coil pattern 312 and the seed layer of the via 320 may be integrally formed, and no boundary therebetween may occur, but are not limited thereto. The electroplating layer of the second coil pattern 312 and the electroplating layer of the via 320 may be integrally formed, and no boundary therebetween may occur, but are not limited thereto.

As another example, when the first coil pattern 311 disposed on the lower surface of the insulating substrate 200, and the second coil pattern 312 disposed on the upper surface of the substrate 200 are separately formed, and are then stacked on the insulating substrate 200 in a batch, to form the coil portion 300, the via 320 may include a high melting point metal layer, and a low melting point metal layer having a melting point lower than a melting point of the high melting point metal layer. In this case, the low melting point metal layer may be formed of a solder containing lead (Pb) and/or tin (Sn). The low melting point metal layer may be melted at least in part due to the pressure and the temperature at the time of stacking in a batch. As a result, for example, an intermetallic compound (IMC) layer may be formed at a portion of a boundary between the low melting point metal layer and the second coil pattern 312.

Based on the directions of FIGS. 1 to 3, the coil patterns 311 and 312 may be protruded from both surfaces of the insulating substrate 200, respectively. As another example, the first coil pattern 311 may be protruded from the lower surface of the insulating substrate 200, and the second coil pattern 312 may be embedded in the upper surface of the insulating substrate 200 to expose the upper surfaces of the second coil pattern 312 from the upper surface of the insulating substrate 200. In this case, since a recess may be formed in the upper surface of the second coil pattern 312, the upper surface of the second coil pattern 312 and the upper surface of the insulating substrate 200 may not be located on the same plane. As another example, the second coil pattern 312 may be protruded from the upper surface of the insulating substrate 200, and the first coil pattern 311 may be embedded in the lower surface of the insulating substrate 200 to expose the lower surface of the first coil pattern 311 from the lower surface of the insulating substrate 200. In this case, since a recess may be formed in the lower surface of the first coil pattern 311, the lower surface of the first coil pattern 311 and the lower surface of the insulating substrate 200 may not be located on the same plane.

Each of the via 320 and the coil patterns 311 and 312 may be formed of a conductive material such as copper (Cu), aluminum (Al), silver (Ag), tin (Sn), gold (Au), nickel (Ni), lead (Pb), titanium (Ti), or alloys thereof, but is not limited thereto.

The external electrodes 400 and 500 may be disposed on surfaces of the body 100, and may be connected to both end portions of the coil portion 300, respectively. In this embodiment, both end portions of the coil portion 300 may be exposed from the first and second surfaces 101 and 102 of the body 100, respectively. The first external electrode 400 may be disposed on the first surface 101 and may be in contact with and connect to an end portion of the first coil pattern 311 exposed from the first surface 101 of the body 100, and the second external electrode 500 may be disposed on the second surface 102 and may be in contact with and connect to an end portion of the second coil pattern 312 exposed from the second surface 102 of the body 100.

The external electrodes 400 and 500 may have a single-layer structure or a multilayer structure. For example, the first external electrode 400 may include a first layer comprising copper, a second layer disposed on the first layer and comprising nickel (Ni), and a third layer disposed on the second layer and comprising tin (Sn). The first to third surfaces may be formed by an electrolytic plating process, but is not limited thereto. As another example, the first external electrode 400 may include a resin electrode including a conductive powder particle and a resin, and a plating layer formed by a plating process on the resin electrode.

The external electrodes 400 and 500 may be formed of a conductive material such as copper (Cu), aluminum (Al), silver (Ag), tin (Sn), gold (Au), nickel (Ni), lead (Pb), titanium (Ti), or alloys thereof, but is not limited thereto.

The insulating film 600 may be formed on the insulating substrate 200 and the coil portion 300. The insulating film 600 may be for insulating the coil portion 300 from the body 100, and may include a known insulating material such as parylene, or the like. An insulating material included in the insulating film 600 may be any material, and is not particularly limited thereto. The insulating film 600 may be formed using a vapor deposition process or the like, but not limited thereto, and may be formed using stacking an insulation film on both surfaces of the insulating substrate 200. In the former case, the insulating film 600 may be formed in the form of a conformal film along the surfaces of the insulating substrate 200 and the coil portion 300. The insulating film 600 may be an optional element and may be thus omitted, when the body 100 secures sufficient insulation resistance under operating conditions of the coil component 1000 according to this embodiment.

EXPERIMENTAL EXAMPLE

Table 1 illustrates changes in inductance (L) and DC resistance (Rdc) in Experimental Examples 1 to 8, as a result of changing a thickness (T1) of an insulating substrate and a thickness (T2) of an upper cover portion.

In all of the following Experimental Examples 1 to 8, a coil portion was manufactured to have the same number of turns. Further, it was also made such that each turn of the coil portion was made to have the same line width and the same thickness (e.g., 140 μm each of the first and second coil patterns), and to have all space between neighboring turns of the coil portion in the same manner. Finally, the inductance (L) and the direct current resistance (Rdc) were measured at the same operating frequency.

TABLE 1

| | T1(μm) | T2(μm) | T2/T1 | L(Ref Change) | Rdc(Ref Change) | Thinned or Not |
|---|---|---|---|---|---|---|
| # 1 | 30 | 60.0 | 2.00 | 60.2% | 98.7% | ○ |
| # 2 | 30 | 80.0 | 2.67 | 80.2% | 99.1% | ○ |
| # 3 | 30 | 195.0 | 6.50 | 116.4% | 105.8% | X |
| # 4 | 30 | 205.0 | 6.83 | 125.1% | 106.0% | X |
| # 5 | 30 | 90.0 | 3.00 | 82.5% | 102.1% | ○ |
| # 6 | 30 | 120.0 | 4.00 | 104.3% | 102.6% | X |
| # 7 | 30 | 105.0 | 3.50 | 91.3% | 102.3% | ○ |
| # 8 | 30 | 115.0 | 3.83 | 100.3% | 102.0% | ○ |

In Table 1, each ratios of L (Ref change) and Rdc (Ref change) was calculated, based on 0.47 mmH and 35 mΩ as reference values, respectively. In Table 1, the item 'Thinned or Not' indicates whether a thickness of the entirety of a component formed up to external electrode exceeded 0.60 mm or not. Therefore, when the thickness of the entire component exceeded 0.60 mm, it is indicated that the component was not thinned (X) in Table 1. In Table 1, in the case of Experimental Examples 1, 2 and 5 in which a ratio of T2/T1 is 3 or less, the inductance thereof decreased, as compared with Experimental Examples 7 and 8 satisfying $3<T2/T1<6$. In the case of Experimental Examples 3 and 4 in which a ratio of T2/T1 is 6 or more, the inductance thereof increased, but the DC resistance (Rdc) increased, not to be thinned, as compared with Experimental Examples 7 and 8 satisfying $3<T2/T1<6$.

Referring to Table 1, in the case of Experimental Example 5 in which T2 was 90 μm or less, the inductance (L) was reduced by 10% or more, as compared with Experimental Examples 7 and 8 satisfying $90\ \mu m<T2<120\ \mu m$. In the case of Experimental Example 6 in which T2 was 120 μm or more, it was impossible to reduce the thickness, as compared with Experimental Examples 7 and 8 satisfying $90\ \mu m<T2<120\ \mu m$.

As a result, as in Table 1, in the case of Experimental Examples 7 and 8 satisfying all of $3<T2/T1<6$, and $90\ \mu m<T2<120\ \mu m$, the inductance (L) thereof was secured while implementing thinning.

In the case of Experimental Example 7, the inductance thereof was somewhat smaller than the reference inductance, but was in the allowable range, within 10%, as compared with the reference value.

In this configuration, the coil component 1000 according to this embodiment may realize high-capacity inductance and low DC resistance (Rdc) while reducing the thickness of the coil component 1000.

According to the present disclosure, high-capacity inductance and low direct-current (DC) resistance (Rdc) may be ensured, while the coil component may be made low profile.

While example embodiments have been shown and described above, it will be apparent to those skilled in the art that modifications and variations could be made without departing from the scope of the present disclosure as defined by the appended claims.

What is claimed is:

1. A coil component comprising:

an insulating substrate;

a first coil pattern, having a planar spiral shape, disposed on one surface of the insulating substrate;

a second coil pattern, having a planar spiral shape, disposed on the other surface of the insulating substrate opposing the one surface of the insulating substrate; and a body embedding the insulating substrate and the first and second coil patterns, and having an active portion in which the first and second coil patterns are disposed, an upper cover portion disposed on an upper surface of the active portion and a lower cover portion disposed on a lower surface of the active portion, wherein a thickness of the body is 550 μm or less (excluding 0), and a total thickness of the upper and lower cover portions is thicker than four times of a thickness of the insulating substrate and thinner than a total thickness of the first and second coil patterns.

2. The coil component according to claim 1, wherein the thickness (T1) of the insulating substrate satisfies 20 μm<T1≤30 μm.

3. The coil component according to claim 1, further comprising a via passing through the insulating substrate to connect the first coil pattern and the second coil pattern to each other.

4. The coil component according to claim 1, wherein the body comprises an insulating resin and a magnetic powder particle.

5. The coil component according to claim 1, further comprising first and second external electrodes disposed on a surface of the body to be respectively connected to both end portions of the first and second coil patterns.

6. The coil component according to claim 5, wherein a thickness of the coil component is 600 μm or less (excluding 0).

7. The coil component according to claim 1, further comprising an insulating film disposed to cover and be in contact with the first and second coil patterns.

8. The coil component according to claim 7, wherein the insulating substrate comprises a through-hole providing an inner surface of the insulating substrate, and the insulating film further covers the inner side surface and an outer side surface of the insulating substrate.

9. The coil component according to claim 1, wherein a ratio of a thickness (T2) of the upper cover portion to the thickness (T1) of the insulating substrate satisfies 3<T2/T1<6.

10. The coil component according to claim 1, wherein a thickness (T2) of the upper cover portion satisfies 90 μm<T2<120 μm.

* * * * *